United States Patent [19]

Thornburg

[11] Patent Number: 5,538,202
[45] Date of Patent: Jul. 23, 1996

[54] HYDRAULIC ACTUATION SYSTEM FOR AIRCRAFT CONTROL SURFACES

[75] Inventor: Francis L. Thornburg, Milwaukie, Oreg.

[73] Assignee: Northrop Grumman Corporation, Los Angeles, Calif.

[21] Appl. No.: 145,936

[22] Filed: Nov. 2, 1993

[51] Int. Cl.$^6$ .................................................. B64C 13/36
[52] U.S. Cl. .................. 244/215; 244/225; 244/75 R; 244/78; 244/90 R
[58] Field of Search ............... 244/75 R, 76 R, 244/78, 220, 221, 225, 226, 227, 213, 214, 215, 90 R, 216

[56] References Cited

U.S. PATENT DOCUMENTS

| | | | |
|---|---|---|---|
| 1,935,004 | 11/1933 | Winther, Jr. | 244/90 R |
| 2,404,045 | 7/1946 | Flader | 244/216 |
| 2,643,833 | 6/1953 | Ambroise | 244/226 |
| 2,861,758 | 11/1958 | Howard | 244/226 X |
| 2,863,321 | 12/1958 | Weiland | 244/226 X |
| 2,899,152 | 8/1959 | Weiland | 244/226 |
| 2,972,898 | 2/1961 | Hartel | 244/226 X |
| 3,051,137 | 8/1962 | Kutzler | 244/78 |
| 3,911,847 | 10/1975 | Worthing | 244/78 X |
| 4,034,334 | 7/1977 | Allyn | 244/76 R X |
| 4,395,007 | 7/1983 | Owl, Jr. . | |
| 4,412,666 | 11/1983 | Grob . | |
| 4,544,118 | 10/1985 | Robinson | 244/225 |
| 4,773,620 | 9/1988 | Seidel | 244/75 R |
| 4,793,137 | 12/1988 | Munk | 244/75 R X |

FOREIGN PATENT DOCUMENTS 856982  12/1960  United Kingdom .................. 244/226

*Primary Examiner*—Galen L. Barefoot
*Attorney, Agent, or Firm*—Terry J. Anderson; Karl J. Hoch, Jr.

[57] ABSTRACT

A hydraulic actuation system for an aircraft control surface such as an elevon. A pair of spaced pivot points are provided to alternately rotate the control surface either clockwise or counterclockwise.

7 Claims, 1 Drawing Sheet

5,538,202

1

HYDRAULIC ACTUATION SYSTEM FOR AIRCRAFT CONTROL SURFACES

BACKGROUND OF THE INVENTION

This invention relates generally to improvements in hydraulic actuation systems for aircraft control surfaces and more particularly to an actuation system having two offset pivot points.

Numerous devices have been proposed for the actuation of aircraft control surfaces and hydraulic, pneumatic and mechanical actuating devices are well known. In aircraft having low thickness to chord ratio (thin high speed wings with sharper leading and trailing edges) little room is left to house the actuators and control arms for the aerodynamic movable surfaces. This is true for low aspect wings, that is, short wing span relative to wing chord length.

Most modern aircraft now, however, utilize high aspect ratio wings which are large span to chord length. As the width (chord) of the wing is decreased and thickness is reduced for high speed, it becomes increasingly important to utilize all available wing space for fuel storage, thus reducing the amount of space available for the control surface actuation system. Examples of multi-cylinder hydraulic actuation systems can be found in U.S. Pat. Nos. 2,861,758, 2,863,321, 2,899,152, and 2,972,898. U.S. Patent Nos. 4,395,007, 4,544,118, and 4,773,620 are representative of single cylinder hydraulic actuation systems.

There exists, therefore, a significant need for an improved hydraulic actuation system which minimizes the space required therefor. The present invention fulfills this need and provides further related advantages.

SUMMARY OF THE INVENTION

In accordance with the invention, an improved hydraulic actuation system is provided for aircraft control surfaces. An upper and lower actuator are each configured to conform to the local exterior or interior contour of the wing skin and each includes a rotational or pivot point about which the control surfaces can rotate. In this manner, the space between the structural box in the wing and the control surface is minimized and maximum moment arm is provided for movement of the surface in either a positive or negative direction.

Other features and advantages of the present invention will become apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENT

Figure 1:
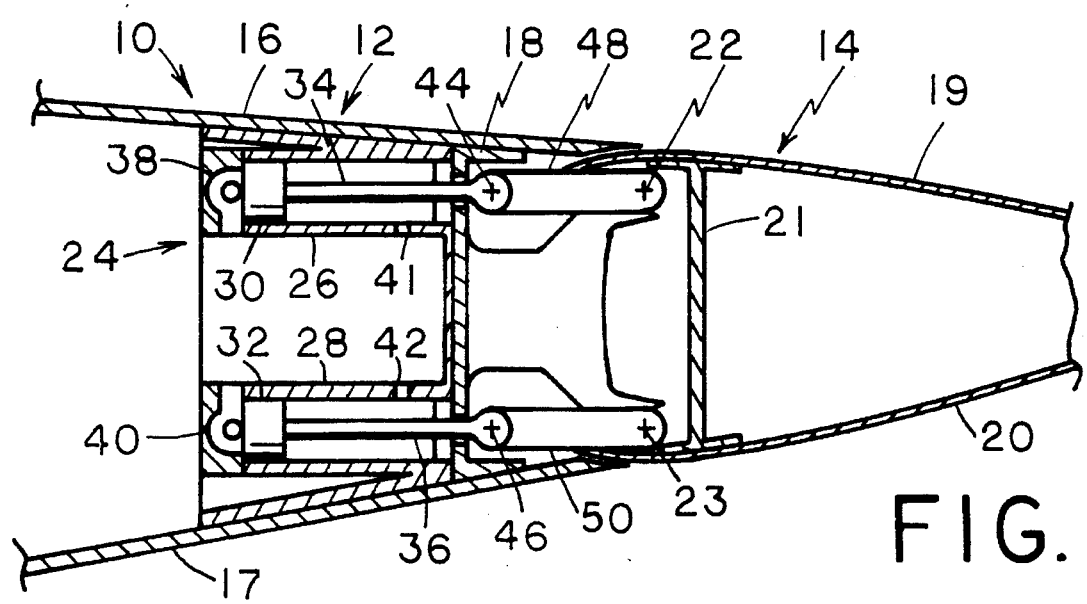
FIG. 1 is a sectional view of the hydraulic actuation system of the present invention in which the control surfaces are in the centered or null position with both actuator pistons seated.

As shown in the exemplary drawings, the present invention comprises a hydraulic actuator 12 disposed between a wing 10 and a control surface 14, such as an elevon. The wing 10 includes a rear spar 18 disposed between an upper wing surface 16 and lower wing surface 17. The elevon 14 includes an upper elevon surface 19 and lower elevon surface 20 disposed around an elevon spar 21. The elevon spar 21 has an upper pivot or hinge point 22 and a lower pivot or hinge point 23.

The actuator 12 includes a cylinder block 24 positioned between the upper wing surface 16 and the lower wing surface 17. The cylinder block 24 has an upper piston cylinder 26 and a lower piston cylinder 28. Upper and lower piston cylinders 26,28 respectively include upper and lower pistons 30,32, upper and lower piston rods 34,36 with hinge points 44,46 at the free ends thereof, upper and lower extend hydraulic pressure ports 38,40, and upper and lower retract or return hydraulic pressure ports 41,42. Upper actuator link 48 extends between and joins the upper piston rod hinge point 44 and the upper elevon pivot point 22. Likewise the lower piston rod hinge point 46 and the lower elevon pivot point 23 are joined by the lower actuator link 50.

The wing 10 and elevon 14 may be constructed of the conventional aluminum aircraft material or of the more modern composite materials. Either a thermoplastic material such as E-glass or a thermoset material such as graphite epoxy can be utilized. The actuator 12 can include a molded plastic cylinder block 24 with the operative actuator elements either of a high impact plastic or metal. Radar absorbent materials can be utilized where appropriate.

The control surface 14 is illustrated in a centered or null position in FIG. 1. In this position, the upper and lower surfaces 19,20 of the control surface 14 generally extend the contour of the upper and lower surfaces 16,17 of the wing 10. With hydraulic pressure applied to the extend pressure ports 38,40 and retract pressure ports 41,42, neither of the pistons 30,32 are extended but remain in their seated positions.

Figure 2:
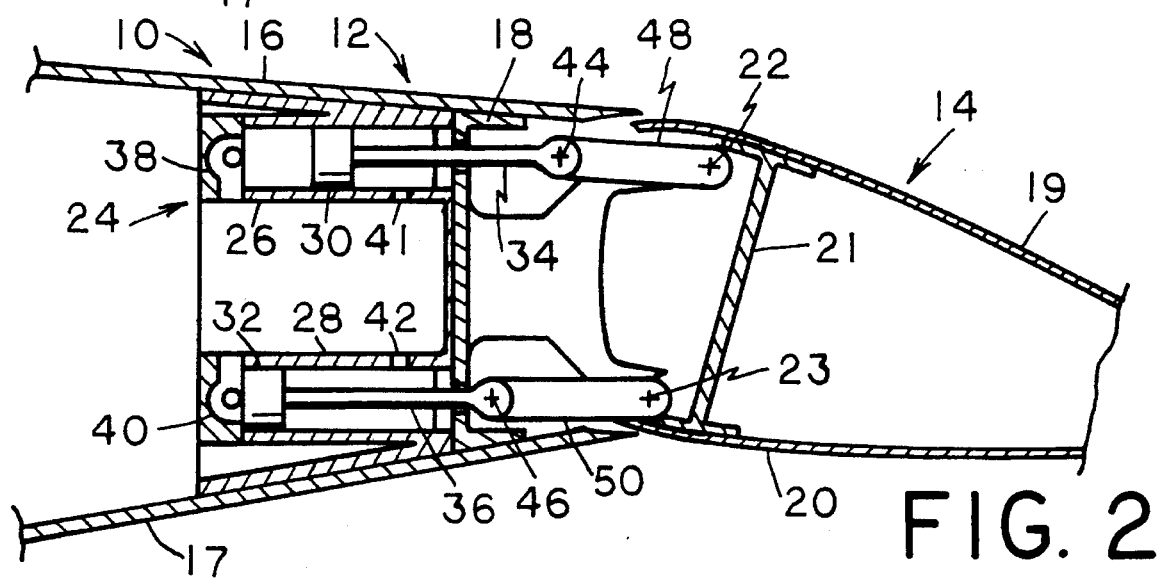
FIG. 2 is a sectional view of the hydraulic actuation system of the present invention in which the control surfaces are rotated downward with the upper actuator piston extended and the lower actuator piston seated.

To move the control surface 14 to the downward position as illustrated in FIG. 2, hydraulic pressure is supplied to the upper extend pressure port 38 for the upper piston 30 so as to extend the upper piston rod 34. The control surface 14 will then rotate or pivot clockwise around the lower pivot point 23 which secures the control surface end of the lower actuator link 50. Supplying hydraulic pressure to the upper retract pressure port 40 will return the control surface 14 to the centered position of FIG. 1.

Figure 3:
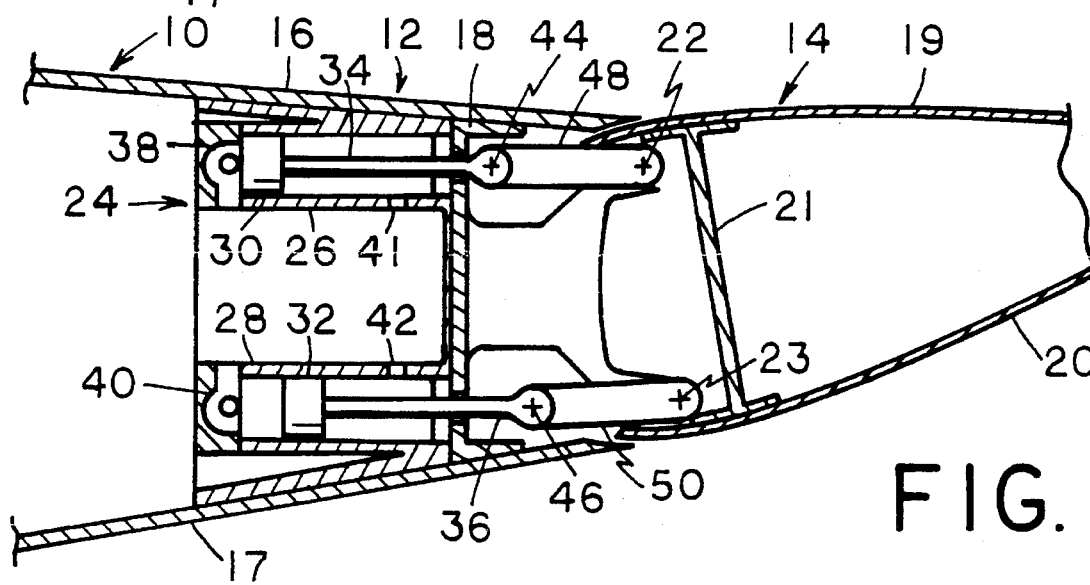
FIG. 3 is a sectional view of the hydraulic actuation system of the present invention in which the control surfaces are rotated upward with the lower actuator piston extended and the upper actuator piston seated.

The upward rotated position of the control surface 14 illustrated in FIG. 3 is achieved by supplying hydraulic pressure to the lower extend pressure port 40 so as to extend the lower piston rod 36. This rotates the control surface 14 counterclockwise about the upper pivot point 22. When hydraulic pressure is supplied to the lower retract pressure port 42, the control surface 14 will return to the FIG. 1 centered position.

In this manner, the control surface 14 can be positioned by the supply of hydraulic pressure to the upper or lower extend pressure ports 38,40 for extending pistons 30,32 and to upper and lower retract pressure ports 41,42 for retracting pistons 30,32. Within the thin aerodynamic section of the wing 10, the molded or machined cylinder block 24 generally conforms to the local exterior wing contour or the local wing underside contour to minimize the space required therefor. A plurality of actuators 12 would be required to rotate the control surface 14, with an actuator 12 at least at each span end of the control surface 14. Each of the upper cylinders 26 would be hydraulically ganged for simultaneous operation as would each of the lower cylinders 28. The piston diameter and number of cylinders would be chosen to meet the control surface load requirements.

With the cylinders located as close to the the wing surfaces as possible, maximum moment arm would be available to rotate the control surface 14. This is also facilitated by having the pivot points 22,23 as close to the spaced undersides of the control surface 14 as possible. An aerodynamic radially faired surface would be provided at all times on the low pressure side of the control surface 14 and electrical continuity can also be maintained between the fixed wing 10 and the pivotable control surface 14. While specifically illustrated and described with an elevon control surface extending from an aircraft wing, the actuator 12 of the present invention is equally applicable to rudders, canards, ailerons, elevators and the like.

The hydraulic system for the actuators 12 would require a shuttle valve (not shown) which would act upon information of the position of the rotatable control surface 14. This valve would automatically lock the proper pivot point, either 22 or 23, by seating the piston corresponding thereto. A secondary detente or locking cylinder (not shown) could also be used for this purpose. The locking/unlocking of the pivot points 22,23 would be accomplished when going through the zero point of piston travel.

In this manner, the hydraulic actuator 12 of the present invention minimizes the space required for the actuator while still providing sufficent actuator force for the control surface 14 with spaced apart or offset alternating rotational pivots 22,23. A wide variety of modifications and improvements to the hydraulic actuation system described herein are believed to be apparent to those skilled in the art. Accordingly, no limitation on the present invention is intended by way of the description herein, except as set forth in the appended claims.

What is claimed is:

1. An actuation system for positioning a control surface operably mounted on an aircraft structural surface, said control surface having first and second skin surfaces and a spar member disposed between said first and second skin surfaces of said control surface at the operable mounting of said control surface with said aircraft structural surface, and said aircraft structural surface having first and second skin surfaces and a spar member disposed between said first and second skin surfaces of said aircraft structural surface at the operable mounting of said aircraft structural surface with said control surface, said actuation system comprising:

a cylinder block disposed in said aircraft structural surface forward of said aircraft structural surface spar member and including a first piston cylinder disposed contiguous to said aircraft structural surface first skin surface and a second piston cylinder disposed contiguous to said aircraft structural surface second skin surface, each of said first and said second piston cylinders having a piston rod extending towards said control surface with each of said piston rods having a free end with a hinge point;

said control surface spar having first and second spaced pivot points disposed towards said aircraft structural surface spar;

a first actuator link operably connecting said hinge point of said first piston rod with said first pivot point of said control surface spar;

a second actuator link operably connecting said hinge point of said second piston rod with said second pivot point of said control surface spar; and means to alternately extend said first and said second piston rods whereby extension of said first piston rod will rotate said control surface about said second pivot point and extension of said second piston rod will rotate said control surface about said first pivot point.

2. The actuation system of claim 1 wherein said aircraft structural surface is an aircraft wing and said control surface is an elevon.

3. An actuation system for positioning a control surface operably mounted on an aircraft wing, said control surface having upper and lower skin surfaces and a spar member disposed between said upper and lower skin surfaces of said control surface at the operable mounting of said control surface with said aircraft wing, and said aircraft wing having upper and lower skin surfaces and a spar member disposed between said upper and lower skin surfaces of said aircraft wing at the operable mounting of said aircraft wing with said control surface, said actuation system comprising:

a cylinder block disposed in said aircraft wing forward of said aircraft wing spar member and including an upper piston cylinder disposed contiguous to said aircraft wing upper skin surface and a second piston cylinder disposed contiguous to said aircraft wing lower skin surface, each of said upper and said lower piston cylinders having a piston rod extending towards said control surface with each of said piston rods having a free end with a hinge point;

said control surface spar having upper and lower pivot points disposed towards said aircraft wing spar, said upper and said lower pivot points spaced apart on said control surface spar;

an upper actuator link operably connecting said hinge point of said upper piston rod with said upper pivot point of said control surface spar;

a lower actuator link operably connecting said hinge point of said lower piston rod with said lower pivot point of said control surface spar; and means to extend and retract said upper and said lower piston rods whereby extension of said upper piston rod will rotate said control surface about said lower pivot point and extension of said lower piston rod will rotate said control surface about said upper pivot point.

4. The actuator system of claim 3 wherein said control surface is an elevon.

5. The actuation system of claim 3 wherein said upper and said lower piston cylinders are parallel to each other.

6. The actuation system of claim 3 wherein said piston rod extending and retracting means include pressure ports at each of said upper and said lower piston cylinders and means to alternately supply hydraulic pressure to said pressure ports.

7. An actuation system for positioning an elevon operably mounted on an aircraft wing, said elevon having upper and lower skin surfaces and a spar member disposed between said upper and lower skin surfaces of said elevon at the operable mounting of said elevon with said aircraft wing, and said aircraft wing having upper and lower skin surfaces and a spar member disposed between said upper and lower skin surfaces of said aircraft wing at the operable mounting of said aircraft wing with said elevon, said actuation system comprising:

a cylinder block disposed in said aircraft wing between said aircraft wing upper and lower skin surfaces and forward of said aircraft wing spar member and including an upper piston cylinder disposed contiguous to said aircraft wing upper skin surface and a second piston cylinder disposed contiguous to said aircraft wing lower skin surface and parallel to said upper piston cylinder, each of said upper and said lower piston cylinders having a piston rod extending towards said elevon with each of said piston rods having a free end with a hinge point;

said elevon spar having upper and lower pivot points disposed towards said aircraft wing spar, said upper and said lower pivot points spaced apart with said upper pivot point disposed near said elevon upper skin surface and said lower pivot point disposed near said elevon lower skin surface;

an upper actuator link operably connecting said hinge point of said upper piston rod with said upper pivot point of said elevon spar;

a lower actuator link operably connecting said hinge point of said lower piston rod with said lower pivot point of said elevon spar; and means to extend and retract said upper and said lower piston rods including pressure ports at each of said upper and said lower piston cylinders and means to alternately supply hydraulic pressure to said pressure ports, extension of said upper piston rod rotating said elevon about said lower pivot point and extension of said lower piston rod rotating said elevon about said upper pivot point.

* * * * *